United States Patent [19]
Osaki

[11] Patent Number: 5,444,706
[45] Date of Patent: Aug. 22, 1995

[54] PACKET EXCHANGE NETWORK AND METHOD OF CONTROLLING DISCARD OF PACKETS IN PACKET EXCHANGE NETWORK

[75] Inventor: Yoshiro Osaki, Tokyo, Japan

[73] Assignee: Kabushiki Kaisha Toshiba, Kawasaki, Japan

[21] Appl. No.: 633,493

[22] Filed: Dec. 26, 1990

[30] Foreign Application Priority Data

Dec. 27, 1989 [JP] Japan .................................. 1-336328

[51] Int. Cl.⁶ .............................................. H04J 3/24
[52] U.S. Cl. ...................................... 370/94.1; 370/60
[58] Field of Search ........................ 370/94.1, 94.3, 60, 370/13, 16, 94.2, 58.1, 58.2, 58.3

[56] References Cited

U.S. PATENT DOCUMENTS

| | | | |
|---|---|---|---|
| 4,475,192 | 10/1984 | Fernow et al. | 370/17 |
| 4,799,215 | 1/1989 | Suzuki | 370/94.1 |
| 4,849,968 | 7/1989 | Turner | 370/94.1 |
| 5,007,052 | 4/1991 | Flammer | 370/94.3 |
| 5,079,762 | 1/1992 | Tanabe | 370/94.1 |
| 5,119,367 | 6/1992 | Kawakatsu et al. | 370/60 |

*Primary Examiner*—Douglas W. Olms
*Assistant Examiner*—Ajit Patel
*Attorney, Agent, or Firm*—Finnegan, Henderson, Farabow, Garrett & Dunner

[57] ABSTRACT

A packet exchange network comprises a plurality of packet exchange nodes connected through trunk lines and terminals connected to the packet exchange nodes each of which is provided a packet storage buffer for storing received packets. When the buffer cannot store every incoming packet due to "traffic congestion," some of the packets are discarded from the buffer by examining and registering the number of relay packet exchange nodes through which the packet passes during the communication at the time of setting a call to start a packet communication and by positively changing a discard rate of packets to be discarded at each relay packet exchange node on the basis of the registered packet exchange node number, so that all the packets have substantially the same discard rate regardless of the relay packet exchange node number.

13 Claims, 6 Drawing Sheets

| RELAY NODE NO. (STAGE NO.) | DISCARD RATE |
|---|---|
| 1 | $e_1$ |
| 2 | $e_2$ |
| 3 | $e_3$ |
| 4 | $e_4$ |
| 5 | $e_5$ |
| TOTAL | E |

PACKET EXCHANGE NETWORK AND METHOD OF CONTROLLING DISCARD OF PACKETS IN PACKET EXCHANGE NETWORK

BACKGROUND OF THE INVENTION

1. Field of the Invention

The present invention relates to a packet exchange network and a method of controlling discard of packets in a packet exchange network in packet communication, asynchronous transfer mode (ATM) communication, line communication and so on, and more particularly, to a method and a system for controlling discard of packets in a packet exchange network capable of realizing a constant packet discard rate throughout an entire network independently of the number of packet exchange nodes through which the packets pass when they are transmitted.

2. Description of the Related Art

In packet communication, data are transmitted through a packet exchange network in the form of packets. In the packet exchange network, packets are asynchronously sent out and arrive at their target terminals through various routes. Accordingly, there may occur a so-called traffic congestion. In the "traffic congestion", packets are converged into a particular packet exchange node or trunk line at a specific time.

In order to avoid the traffic congestion, in a conventional network, a buffer having a proper capacity is provided upstream of a packet switch in a packet exchange node or upstream of a trunk line to which a packet is sent from the packet exchange node.

FIG. 1 shows a block diagram of a packet discard control unit for packet exchange nodes in a packet exchange network provided in a conventional packet discard control system for the purpose of avoiding the traffic congestion.

In FIG. 1, reference numeral 1 denotes a terminal, 5 a trunk line, 55 a packet switch 55 provided within a packet exchange node, 56 a buffer capacity detector, 58 a buffer and 60 a packet discard processor 60. In operation, a packet arrived at the buffer 58 through the packet switch 55 in the packet exchange node from the terminal 1 is temporarily stored in the buffer 58 to be sent later to the trunk line 5.

When the buffer 58 is filled up with packets, the buffer capacity detector 56 detects the full state of the buffer and informs the packet discard processor 60 of the full state. The discard processor 60, when receiving the information indicative of the full state, discards some of the packets, usually the last-arrived packet.

In conventional packet discard control systems, a buffer such the buffer 58 described above is provided and in the traffic congestion, the buffer discards a packet or packets overflowed therefrom with no conditions (although there is a condition in a conventional system that all data packets should be passed even some of them are passed with delay while some voice packets may be discarded but others should be passed faster). As a result, in conventional systems, packet discard rate varies depending on the number of packet exchange nodes passed in each communication.

Accordingly, when a fixed packet discard rate which ensures desirable communication quality is to be determined in view of statistics of the past traffic conditions, it is necessary to adopt the worst discard rate, i.e., a discard rate corresponding to a communication requiring to pass the maximum number of packet exchange nodes in the packet exchange network. This allows to give most communications which require a smaller number of packet passage exchange nodes a communication quality beyond their requirements, which is a waste of the transmission capacity of trunk lines.

Thus, the conventional packet discard control system may possibly result in the reduction of the throughput in the entire network.

SUMMARY OF THE INVENTION

Accordingly, it is an object of the present invention to provide a packet exchange network and a packet discard control method in a packet exchange network capable of setting a fixed packet discard rate for packet communications and yet preventing allocation of a high communication quality beyond a required level to a communication which is required to pass a small number of relay nodes as well as ensuring a sufficient quality for a communication which is required to pass a large number of relay nodes, thereby improving the transmission throughput of the entire network.

According to an aspect of the present invention, the number of relay packet exchange nodes through which the packet is to be transmitted during communication is examined and registered at the time of setting a call to start a packet communication, and a packet requiring a smaller number of relay nodes is preferentially discarded at each relay packet exchange node on the basis of the registered packet exchange node number during the communication.

As a result, the possibility of being discarded during communication for a packet requiring a large number of relay packet node, which is high and thus put in undesirable circumstances in the conventional system, is a remarkably reduced. Thus even such the quality of a communication that is required to pass a large number of relay nodes can be ensured.

According to another aspect of the present invention, the packet discard rate for packets to be discarded at each relay packet exchange node is positively changed according to the registered packet exchange node number so that all the packets have a fixed discard rate independently of the number of the relay packet exchange nodes to be passed during communication.

Thus, even when the number of packets to be used in the entire network is substantially the same as in the packet discard control of the conventional system, by not allocating a high quality beyond the required level to a communication requiring a small number of relay nodes, the quality of a communication requiring a large number of relay nodes is ensured, which results in that the packet discard rate set to a fixed value can be substantially reduced and therefore the transmission throughout of the entire network is improved.

Accordingly, even when the fixed packet discard rate is substantially the same as in conventional systems, the number of packets capable of being input to the network can be increased. That is, the allowable communication capacity can be increased even when substantially the same packet exchange network as in the conventional systems is used.

The number of the relay packet exchange nodes to be passed may be registered in a specific section of the corresponding packet or in a memory section of the corresponding packet exchange node. Further, the number of the packet exchange nodes may be registered

DESCRIPTION OF THE PREFERRED EMBODIMENTS

Figure 1:
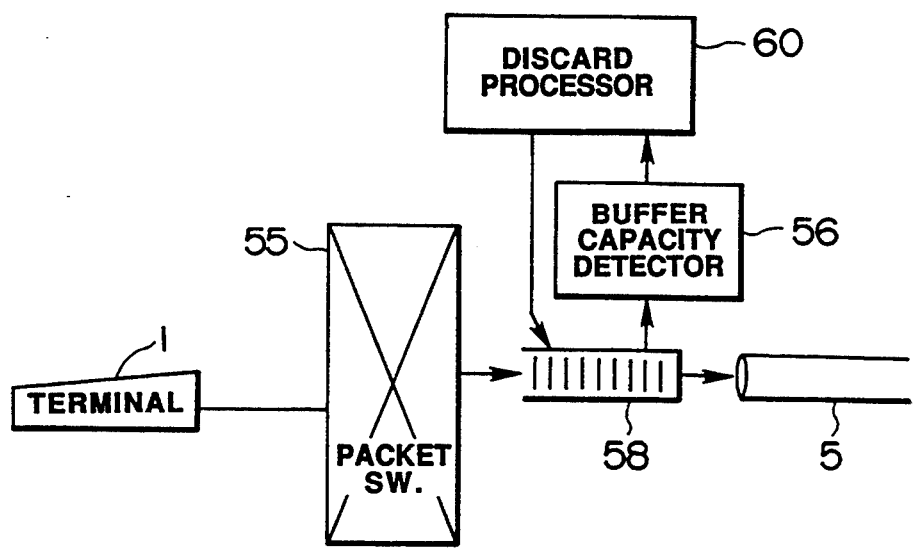
FIG. 1 is a block diagram showing a structure of a packet discard control part in a packet exchange node conventionally employed in a packet exchange network.
Figure 2:
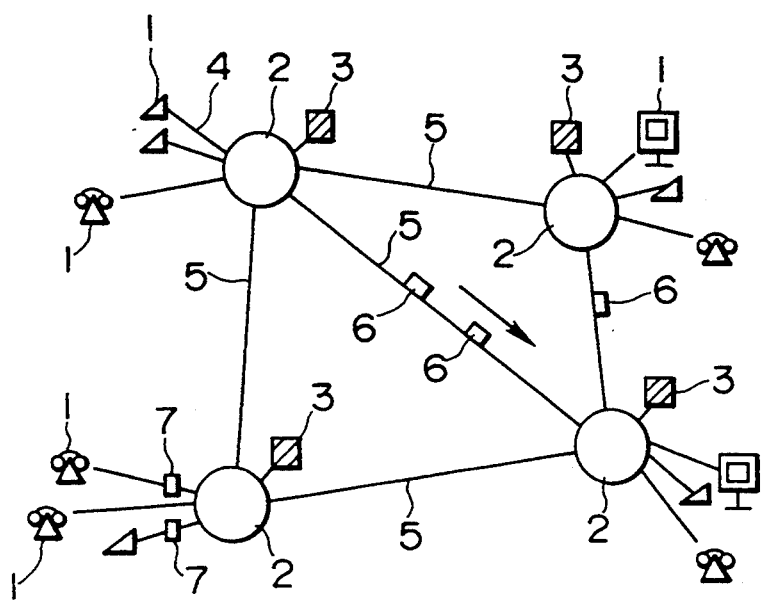
FIG. 2 is a schematic block diagram of an arrangement of a packet exchange network to which a packet discard control method in accordance with the present invention is applied.

Referring to FIG. 2, there is shown a packet exchange network to which a packet discard control method and system in accordance with an embodiment of the present invention is applied;

The packet exchange network of FIG. 2 includes terminals 1 for various sorts of communication medium such as data, voice and picture connected in the packet exchange network. Also included in the packet exchange network are packet exchange nodes which are connected directly or indirectly to the associated terminals 1 to respectively perform their general management and control over the associated terminals, and convert communication data received from the terminals into packet form data and also convert packets transmitted from other sender terminals belonging to the other packet exchange nodes and received therein, into data reproducible in the receiver terminals.

In the network, network controllers 3 are disposed in the respective packet exchange nodes 2 to mainly perform network control between the packet exchange network and the respective packet exchange nodes on the basis of calling data issued from the respective terminals 1, subscriber lines 4 are connected between the respective terminals 1 and the associated packet exchange nodes 2, trunk lines 5 are connected between the packet exchange nodes 2, a packet 6 illustrated in a model form as transferred on the trunk line 5, and a terminal interface 7 is provided, when the terminal 1 has no function of informing the associated network controller 3 of the calling data, as connected between the terminal 1 and the associated packet exchange node 2 to make up for the informing function.

Figure 3:
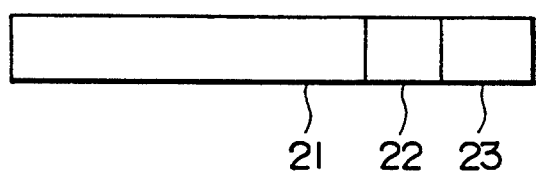
FIG. 3 schematically shows a packet format employed in a packet discard control method according to an embodiment of the present invention.

FIG. 3 shows a basic identifier format of calling and calling completion packets used in a packet discard control system in accordance with an embodiment of the present invention.

The calling and calling completion packets have substantially the same format. In FIG. 3, in more detail, a procedure parameter necessary at the time of setting a call is placed in a section 21, the number of packet exchange nodes through which a packet is transferred, i.e., the number of relay nodes is registered in a section 22 to display the registered relay node number at each relay node, and relay data corresponding to the sequential destinations of the packet are registered in a section 23 to display the registered relay data at each relay node.

Figure 4:
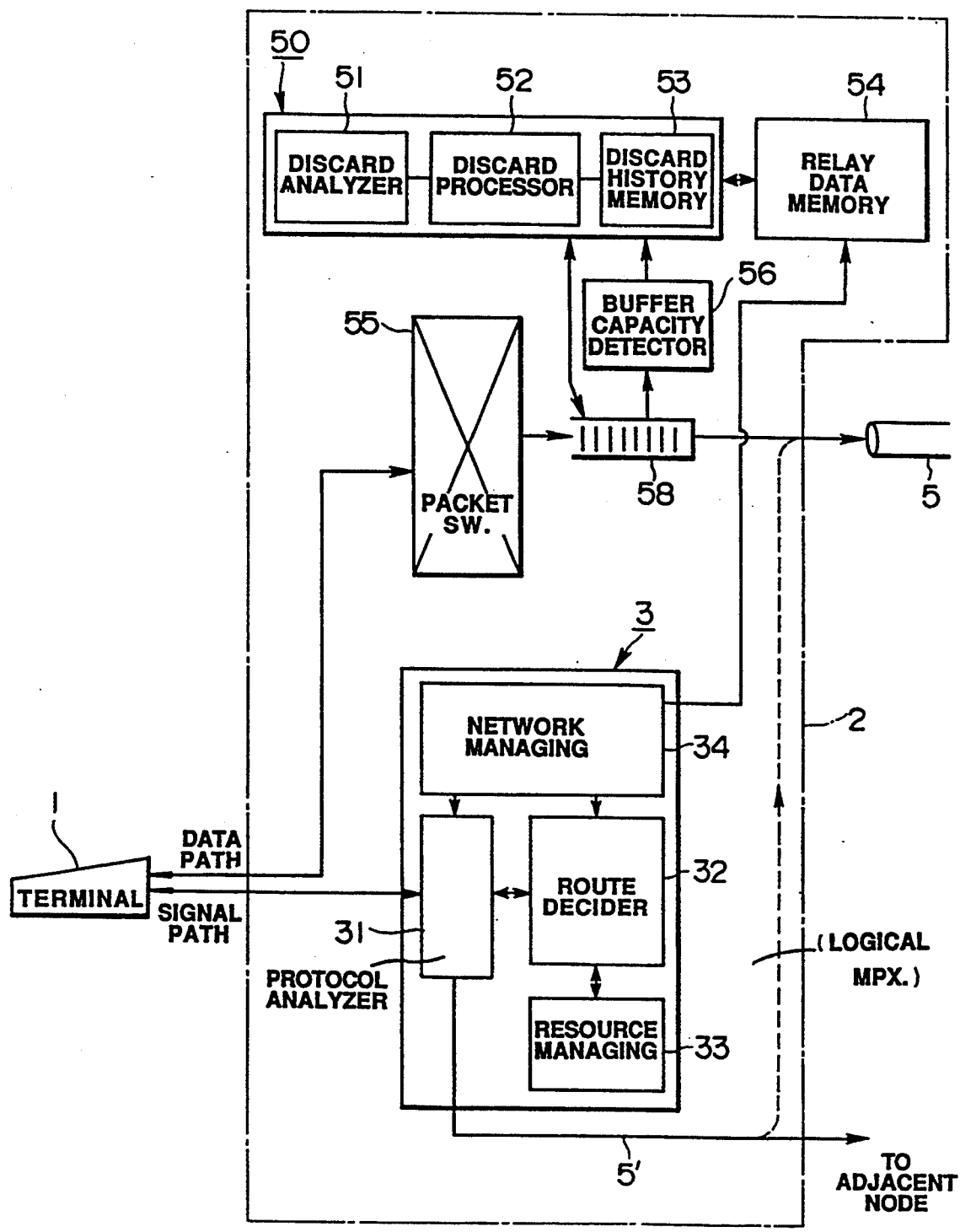
FIG. 4 is a block diagram showing arrangements of a network controller and a packet discard controller provided in a packet exchange node employed in an embodiment of the packet discard control system according to the present invention.

FIG. 4 shows a block diagram of details of each packet exchange node 2 in the foregoing embodiment, including the network controller 3 and the associated packet discard controller.

As shown in FIG. 4, the network controller 3 has a calling protocol analyzer 31, a route decider 32, a line resource manager 33 and a network manager 34. The terminal 1 is connected to the calling protocol analyzer 31 through a signal path. The network manager 34 acts to manage the calling protocol analyzer 31 and the route decider 32. More specifically, in the packet exchange network of FIG. 2, when it is desired to transfer a communication data from one (call origination terminal) of terminals 1 to another (destination terminal), the call origination terminal transmits a calling data to the network controller 3 of the packet exchange node 2 to which the origination terminal belongs. When the calling data in the form of a packet, i.e., a calling packet is sent to the calling protocol analyzer 31 of the network controller 3 in FIG. 4, the analyzer 31 analyzes a relay data indicated in the relay data display section 23 (refer to FIG. 3) of the received calling packet. The analyzed relay data is informed to the route decider 32.

The route decider 32 decides, on the basis of the contents of the informed relay data, one of the trunk lines connected to the specified destination terminal, that is, a route leading to the destination terminal, and transfers the calling data to the adjacent packet exchange node on the decided route.

In this connection, the route decider 32, when informed of a date indicative of the occurrence of a trouble on the trunk line of the decided route or a data indicative of the occurrence of a congestion from the network manager 34, also refuses the reception of the call from the terminal 1 and judges whether or not the accepting of a new call from another terminal in cooperation with the line resource manager 33 to be explained later.

That is, in this embodiment, the calling data issued from the terminal also contains, in addition to the above relay data and the address data of its own terminal, e.g., a data indicative of an average transfer rate about the communication data of the terminal itself and a data indicative of the size of a burst for the communication data, and these data are also analyzed at the calling protocol analyzer 31 and the analyzed content is informed to the route decider 32. The line resource manager 33 predicts the quality of the trunk line when the new call from the call request terminal is added, on the basis of the trunk transmission rate of the trunk line specified based on the identification data of the trunk line informed from the route decider 32, traffic parameters of the respective terminals now using the trunk line so far informed from the route decider 32, i.e., the data indicative of the average transfer rate of the communication data and the size of the burst, and data indicative of an average transfer rate of a communication data of the call request terminal newly informed from the route decider 32 and the size of a burst for the communication data; and instructs the route decider 32 to accept the call from the call request terminal only when the predicted line quality is maintained at such a level higher than a predetermined value that can satisfy the transmission qualities required by the respective terminals using the trunk line.

The route decider 32, when receiving a call permission signal from the line resource manager 33 in this manner, informs the calling protocol analyzer 31 of the permission of the call and the trunk line 5 to be used for the data transmission. This causes the calling protocol analyzer 31 to transmit the calling packet to the adjacent exchange node 2 connected to the corresponding trunk line 5. For the transmission of the call, a private communication line 5' may be used, or the trunk line 5 may be commonly used as the primate communication line 5' on a so-called logical multiplex basis.

Explanation will now be made as to the transfer of the calling packet and its calling completion packet by referring to FIG. 5.

Figure 5:
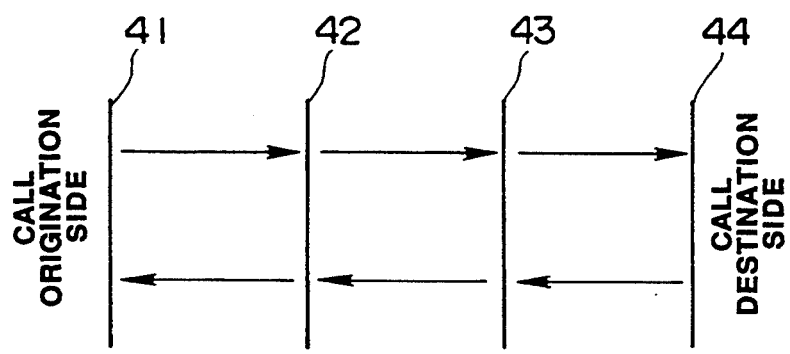
FIG. 5 is a schematic diagram showing a cell setting procedure between call origination and destination nodes in a packet exchange network.

In FIG. 5, reference numerals 41, 42, 43 and 44 correspond to the packet exchange nodes 2 in FIG. 2, the node 41 is a call origination node and the node 44 is a call destination node.

When the network controller 3 permits the call from the terminal in the packet exchange node 41 of the call origination as mentioned above and the calling packet is to be transferred from the call origination node 41, the value of the relay node number shown in the relay node number display section 22 (refer to FIG. 3) of the calling packet is first reset at "0" in the packet exchange node 41. Thereafter, a suitable trunk line is selected through the network controller 3 of its own node and the calling packet is sequentially transmitted to the associated packet exchange nodes 42 and 43. Such calling packet transmission is continued up to the packet exchange node 44 as the call destination on the basis of the relay data shown in the relay data display section 23 (refer to FIG. 3) of the calling packet.

At this time, the value of the relay node number display section 22 of the calling packet to be transferred is added by "1" at each of the packet exchange nodes. Accordingly, the relay node number has a value of "0" at the packet exchange node 41, "1" at the node 42, "2" at the node 43 and "3" at the node 44. When the addition of "1" is completed at the call destination node 44, the value ("3" in this example) of the relay node number display section 22 of the calling packet refers to the number of relay nodes (corresponding in number to relay buffers) on the communication route.

The network controller 3 of the packet exchange node 44 having the destination terminal connected thereto completes the addition processing of the relay node number, provides a display of the incoming call to the destination terminal, and returns a calling completion packet back to the call origination node 41 through the same route but in the opposite direction. In this case, the value ("3" in this example) of the relay node number after the completion of the addition is registered in the relay node number display section 22 of the calling completion packet. The value of the relay node number of the calling completion packet is also referenced also at the packet exchange nodes 42 and 43 on the transfer route.

The call origination node 41, when receiving the calling completion packet, sends the calling completion packet to the call origination terminal, at which stage the calling is completed.

During a time period between the establishment of the calling operation and the occurrence of a cut-off request from the call destination terminal, the thus-secured route from the packet exchange node 41 to the node 44 is maintained to exchange communication data between the call origination and destination terminals. In this case, decision of the packet discard at the buffers in the respective packet exchange nodes 41, 42, 43 and 44 is made on the basis of the registered relay node number. This will be explained with reference to the packet discard controller in the packet exchange node of FIG. 4.

That is, in FIG. 4, a relay data memory 54 receives from the network controller 3 the relay data of the corresponding packet between its own packet exchange node and the adjacent packet exchange node with respect to the above secured route and stores the relay data therein, a buffer 58 is provided upstream the trunk line 5. The packet received from the terminal 1 through the data transmission path and the packet switch 55 is temporarily stored in the buffer 58. The buffer 58 has a finite capacity due to physical restrictions and a delay problem.

Since the total quantity of packets is limited by the network controller 3 when the packet is issued from the terminal as explained above, the discard rate at the buffer 58 is suppressed to a constant value or less.

A buffer capacity detector 56 monitors the amount of packets temporarily stored in the buffer 58 and when the packet storage amount exceeds the prescribed value, informs a discard processor 50 of the fact.

The discard processor 50 has a discard packet analyzer 51, a packet discard processor 52 and a packet discard history memory 53.

The discard packet analyzer 51 functions to retrieve all the packets of the buffer 58 on the basis of a signal indicative of the packet amount exceeding the prescribed value and informed from the buffer capacity detector 56, and decides a packet or packets to be preferentially discarded.

The packet discard history memory 53 stores therein the history of packets discarded at different discard rates for different relay node numbers, and the discard packet analyzer 51 decides packets to be discarded so that the packet discard rates for the respective relay node numbers become closest to their predetermined values. In this case, the number of relay nodes through which each packet is to be transmitted can be known by retrieving the relay node number display section 22 (refer to FIG. 3) of each of the packet stored in the buffer 58.

Explanation will be made as to the algorithm on the basis of which the discard packet analyzer 51 decides a packet to be discarded.

The discard packet analyzer 51 decides packets to be discarded every time, on the basis of the relay node number registered in the relay node number display section 22 of each packet, that is, on the basis of the number of packet exchange nodes through which the packets are to be transferred and according to a rule that "a packet having a less number of packet passage nodes is preferentially discarded". The term "preferentially" as used herein means, for example, the following.

Packets having a relay node number of "5" registered in the memory are discarded at a discard rate of 2 among 10.

Packets having a relay node number of "4" registered in the memory are discarded at a discard rate of 3 among 10.

Packets having a relay node number of "3" registered in the memory are discarded at a discard rate of 4 among 10.

Packets having a relay node number of "2" registered in the memory are discarded at a discard rate of 5 among 10.

Packets having a relay node number of "1" registered in the memory are discarded at a discard rate of 6 among 10.

That is, a packet having a less number of packet passage nodes is not always discarded. Thus, to this end, it is necessary to manage the so far packet discard history and to decide the sort (relay node number) of packets to be discarded. It is the packet discard history memory 53 in this embodiment that manages and stores such packet discard history. And the aforementioned prescribed value to which the discard packet analyzer 51 is referenced in this case, is determined as follows. In other words, the values of discard rates predetermined for different sorts of packets (for different relay node numbers registered for respective packets) so as to be closest to such a condition that, for example, all the packets have a predetermined discard rate regardless of their packet passage node numbers, is determined as follows for example.

Figures 6, 7:
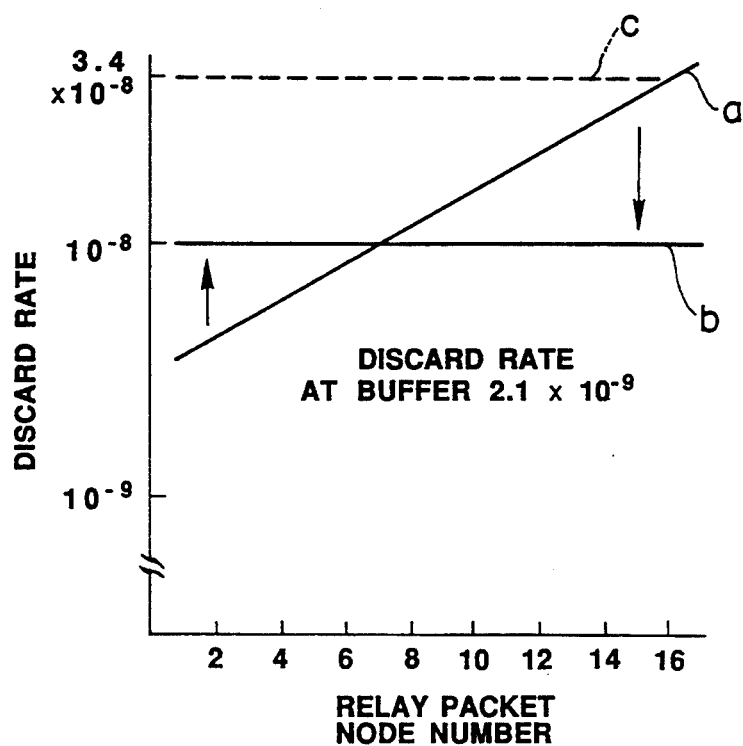
FIG. 6 schematically shows an example of a packet discard control table to be referenced in the respective packet discard controller in the packet discard control system of the present invention.
FIG. 7 is a graph comparatively showing a packet discard rate characteristic based on a conventional packet discard control system and a packet discard rate characteristic based on an embodiment of the packet discard control method of the present invention.

Assume that the discard packet analyzer 51 stores such a discard rate table with respect to packet sorts (relay node numbers) for packet discard control as shown in FIG. 6, in which reference symbol E denotes a total of discard rates for packets in the buffer 58, $e_1$ denotes a discard rate for packets having a relay node number (step number) of 1, $e_i$ denotes a discard rate for packets having a relay node number (step number) of i, and N denotes the number of sorts (packet sorts) of relay node numbers. Then the discard rates are determined to satisfy the following equations (1) and (2), that is, by solving the equations (1) and (2) with respect to $e_i$.

$$e_i/N = E \quad (1)$$

$$(1-e_1) = (1-e_i)^i \quad (2)$$

where i=2 to N.

The value of E is known because E corresponds to a discard rate (the value of which itself is the same as in the conventional system) preset for the buffer 58.

In the actual solution of the equations, $e_1$ is first given to sequentially find $e_2$ to $e_N$ in accordance with the equation (2) and then the value of E is obtained with use of the found $e_2$ to $e_N$ in accordance with the equation (1). In the equation (2), the left side $(1-e_1)$ indicates a rate at which the associated sort of packets (having a registered relay node number of "1") remain alive without being discarded. Similarly, the right side $(1-e_i)^i$ indicates a rate at which the associated sorts of packets having registered relay node numbers of "2 to N") remain alive without being discarded. Hence $e_i$ satisfying the actual value E can be calculated in a relatively short time by repeating the following procedures (a) and (b).

(a) The actual values of $e_1$ are previously prepared and the then values of E are previously found.

(b) A given value of E is compared with the values thereof found in the procedure (a) to find one of the actual values of $e_1$ closest thereto and also find one of the values of $e_1$ with use of which the value of E closest to the actual value thereof is calculated. The values of $e_1$ thus obtained are placed in the above packet discard control table (refer to FIG. 6).

Although the number of sorts (packet sorts) of relay node numbers have been set at "5", that is, N=5 has been set in FIG. 6, the number may be arbitrarily set according to the scale of a packet exchange network to which the invention is actually applied. In the case of FIG. 6, the respective packet discard rates are set through the aforementioned procedures so as to satisfy at least the following relation (3).

$$e_1 > e_2 > e_3 > e_4 > e_5 \quad (3)$$

The discard packet analyzer 51 references to such a packet discard control table as prepared in the format shown in FIG. 6 and decides packets to be discarded (more exactly, the sort of such packets) on the basis of the so-far packet discard history of the packet exchange node in question. When packets to be discarded are decided in this manner, the packet discard processor 52 of the same discard processor 50 discards the corresponding packets from the buffer 58 and the discard history (discard rate) of the packet discard history memory 53 is rewritten on the basis of the discarded result of the processor 52.

According to this embodiment, since packets to be discarded each time can be decided on the basis of the so far packet discard history and with use of such discard rate $e_i$ as satisfy the equations (1) and (2), the packet discard rates of i of relay nodes between the call origination and destination terminals can be set all at an identical value.

FIG. 7 is a graph showing a comparative relationship between a packet discard rate characteristic a based on a conventional packet discard control system and a packet discard rate characteristic b based on the present embodiment. It will be clear from FIG. 7 that the packet discard rate is constant between the call origination and destination terminals regardless of the packet relay node number in this embodiment.

In this connection, the packet discard rate of the characteristic line b in FIG. 7 is expressed as follows according to the above definition.

$$1-(1-e_i)^i$$

FIG. 7 shows the relationships between the relay node number and the packet discard rate when the maximum relay node number N is set at 16 and the packet discard rate at the buffer per one node is set at about $2.1 \times 10^{-9}$. In such a conventional discard control system as shown by the characteristic line a, as the relay node number increases, the packet discard rate increases because the packet discard is carried out independent of the packet relay node number. In the present example, since the case where packet transmission is carried out through a maximum of 16 stage relay nodes must be taken into consideration as the worst case, the discard rate must be set at about $3.4 \times 10^{-8}$ to insure a good quality of communications.

In this embodiment, on the other hand, as shown by the characteristic line b, the packet discard rate is not varied depending on the relay node number and thus the discard rate of packets having a large relay node number is relatively reduced when compared with that of the conventional method. For this reason, the packet discard rate can be set to be as low as $1 \times 10^{-8}$ for respective communications.

It has been explained in the foregoing that the buffer discard rate can be set constant and the packet discard rate for respective communications can be set low. However, when the packet discard rate is set constant for the respective communications, the buffer discard rate can be set to be correspondingly larger.

In the example of FIG. 7, for example, when the packet discard rate is set at about $3.4 \times 10^{-8}$ as in the conventional method (refer to a broken line c in FIG. 7), the number of packets capable of being communicated without being discarded can be also increased. That is, the number of calls acceptable in the call restricting control of the network controller 3 can be increased and therefore the overall capacity of communications which can be handled in the entire network can be also increased.

In the foregoing embodiments, each packet exchange node 2 (more exactly, each discard packet analyzer 51) has decided packets to be discarded in such a manner that the packet discard rate do not depend on the number of packet exchange nodes through which all packets are transmitted and has a predetermined value. However, the node 2 may decide packets to be discarded in such a manner that packets about a communication having merely a small registered number of relay nodes are preferentially discarded, that is, the node 2 may decide packets to be discarded such a manner as to merely satisfy the equation (3) in the example of FIG. 6, whereby packets having a large relay packet node number (which means that the possibility of such packets to be discarded during the transmission is high and thus put in undesirable circumstances in the conventional method) can be discarded with a remarkably reduced discard possibility and thus such a communication that requires a large number of relay nodes can have a sufficient quality.

Figure 8:
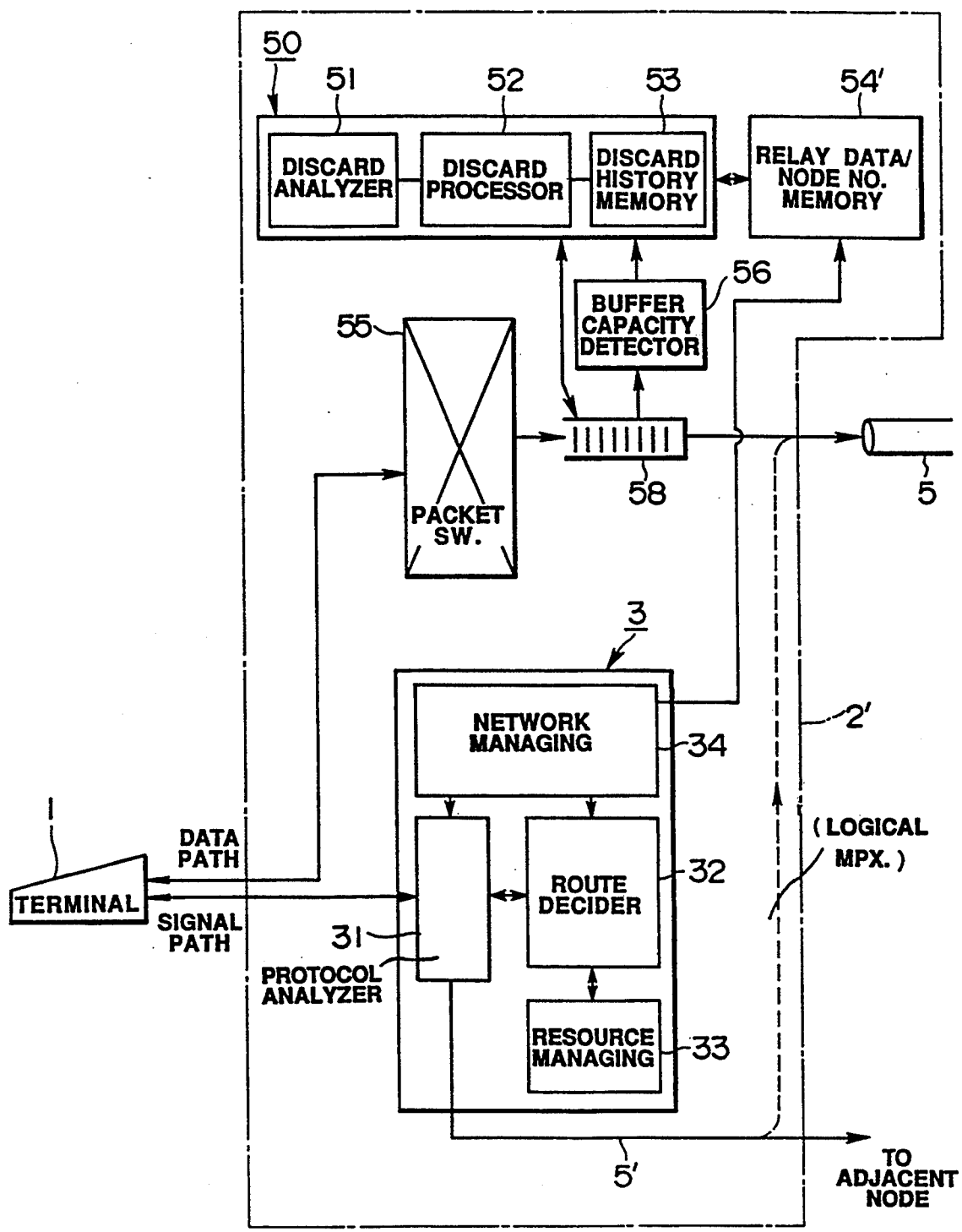
FIG. 8 is a block diagram showing arrangements of a network controller and a packet discard controller provided in a packet exchange node employed in another embodiment of the packet discard control system according to the present invention.

The relay node number display section 22 is provided as registered in the packet as shown in FIG. 3 and each packet exchange node can recognize the relay node number by referring to the section 22 registered in the packet in the foregoing embodiments. However, as shown in FIG. 8 for example, the relay data memory 54 in FIG. 4 may be replaced by a relay data/relay node number memory 54' provided in each packet exchange node so that the relay node number counted in the call setting mode explained with reference to FIG. 5 is written into the memory 54' together with the aforementioned relay data.

These data are written through the network controller 3 (more exactly, network manager 34) into the memory 54' in the call setting mode. In the latter case, each exchange node 2' (more exactly, discard packet analyzer 51) can know the relay node number of each packet to be referenced in deciding packets to be discarded, by retrieving the relay data/relay node number memory 54'. Of course, in this case, since each packet requires no relay node number display section 22, the packet can have such a format as shown in FIG. 9 with the section 22 removed.

Figure 9:
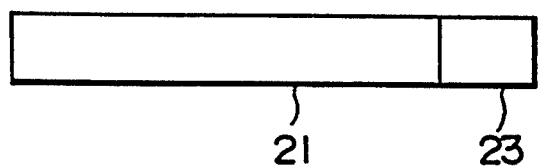
FIG. 9 schematically shows a packet format employed in the embodiment of FIG. 8.
Figure 10:
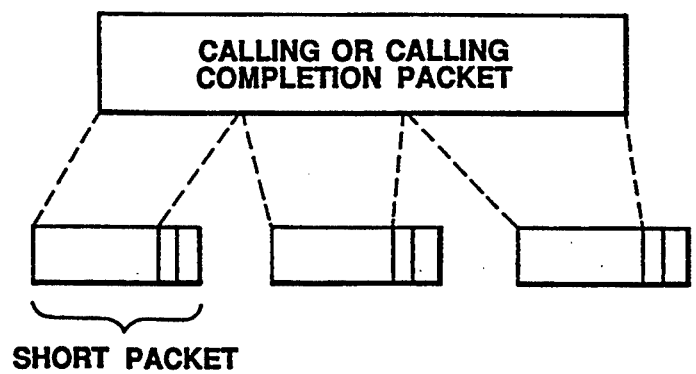
FIG. 10 schematically shows another example of the packet format employable in the present invention.

In the foregoing embodiments, each of these packets has been explained a short packet as shown in FIGS. 3 or 9 for the single calling or calling completion packet. However, the present invention is not limited to the particular embodiments. For example, even when a single large calling or calling completion packet is divided into a plurality of short packets to be transmitted as shown in FIG. 10, the packet discard control method and the packet exchange network of the present invention can be applied.

What is claimed is:

1. A packet exchange network in which communication data is transmitted in packets, comprising:
   a plurality of packet exchange nodes each including packet storage buffer means of a predetermined capacity for sequentially and temporarily storing received packets;
   terminals respectively connected to the packet exchange nodes; and
   a plurality of trunk lines connected between the packet exchange nodes, for transmitting communication data therebetween, the packet storage buffer means being connected in series with the plurality of trunk lines, the communication data being transmitted between the packet exchange nodes and the terminals via a transmission route, the transmission route being determined in each of the packet exchange nodes at a time of setting a call when one of the terminals issues a call connection request for communication, the transmission route thus determined being used until the communication is completed, some of the packets being discarded when the packets are converged into one of the trunk lines so that the packet storage buffer means associated with said one of the trunk lines becomes unable to store all of the packets, wherein
   each of the packets includes a relay node number registering section in which a number of packet exchange nodes through which each packet passes in the transmission route during the communication is to be registered, and wherein
   the packet exchange nodes each comprise:
   buffer stored packet detecting means for detecting the number of received packets stored in the packet storage buffer means and for outputting a signal when the detected packet number exceeds a predetermined value corresponding to the predetermined capacity of the storage buffer means; and
   packet discard processing means for preferentially discarding a packet having a smaller registered relay node number by referencing to the relay node number of each of the packets stored in the packet storage buffer means, when the buffer stored packet detecting means outputs the signal.

2. A packet exchange network as set forth in claim 1, wherein the packet discard processing means comprises discard selection means for selecting packet to be discarded in such a manner that packet discard rates of all packets are substantially the same regardless of the relay node number while referring to a packet discard history at the packet exchange nodes.

3. A packet exchange network in which communication data is transmitted in packets, comprising:

a plurality of packet exchange nodes each including packet storage buffer means of a predetermined capacity for sequentially and temporarily storing received packets;

terminals respectively connected to the packet exchange nodes; and a plurality of trunk lines connected between the packet exchange nodes, for transmitting communication data therebetween, the packet storage buffer means being connected in series with the plurality of trunk lines, the communication data being transmitted between the packet exchange nodes and the terminals via a transmission route, the transmission route being determined in each of the packet exchange nodes at a time of setting a call when one of the terminals issues a call connection request for communication, the transmission route thus determined being used until the communication is completed, some of the packets being discarded when the packets are converged into one of the trunk lines so that the packet storage buffer means associated with said one of the trunk lines becomes unable to store all of the packets, wherein each of the packets includes a relay node number registering section in which a number of packet exchange nodes through which each packet passes in the transmission route during the communication is to be registered, and wherein the packet exchange nodes each comprise:

buffer stored packet detecting means for detecting the number of received packets stored in the packet storage buffer means and for outputting a signal when the detected packet number exceeds a predetermined value corresponding to the predetermined capacity of the storage buffer means; and packet discard processing means for preferentially discarding a packet having a smaller registered relay node number by referencing to the relay node number of each of the packets stored in the packet storage buffer means, when the buffer stored packet detecting means outputs the signal;

the packet discard processing means further comprising discard selection means for selecting packets to be discarded in such a manner that packet discard rates of all packets are substantially the same regardless of the relay node number while referring to a packet discard history at the packet exchange nodes;

the packet discard processing means additionally comprising packet discard history memory means for storing the packet discard history at the packet exchange node, a packet discard rate table for listing packet discard rates previously determined with respect to the respective relay node numbers so that the packet discard rates are substantially the same regardless of the relay node numbers, and discard packet analyzing means, when the buffer stored packet detecting means outputs the signal, for selecting from the packet discard table the relay node number corresponding to the packet discard rate satisfying that the packet discard rates are substantially the same regardless of the relay node numbers in accordance with the relay node number of each of the packets stored in the packet storage buffer means and the packet discard history stored in the packet discard history memory means, and determining a packet corresponding to the selected registered relay node number as a packet to be discarded.

4. A packet exchange network in which communication data is transmitted in the form of a packet, comprising:

a plurality of packet exchange nodes each including packet storage buffer means of a predetermined capacity for sequentially and temporarily storing received packets;

terminals connected to the packet exchange nodes; and a plurality of trunk lines connected between the packet exchange nodes, for transmitting communication data therebetween, the packet storage buffer means being connected in series with the plurality of trunk lines, the communication data being transmitted between the packet exchange nodes and the terminals via a transmission route, the transmission route being determined in each of the packet exchange nodes at a time of setting a call when one of the terminals issues a call connection request for communication, the transmission route thus determined being used until the communication is completed, some of the packets being discarded when the packets are converged into one of the trunk lines so that the packet storage buffer means associated with said one of the trunk lines becomes unable to store all of the packets, wherein the packet exchange nodes each comprise:

relay node memory means for storing a relay node number for each packet, the relay node number being a number of relay packet exchange nodes in the transmission route through which a packet passes;

buffer stored packet detecting means for detecting the number of received packets stored in the packet storage buffer means and for outputting a signal when the detected packet number exceeds a predetermined value corresponding to the predetermined capacity of the storage buffer means; and packet discard process means for preferentially discarding a packet having a smaller registered relay node number among the relay node numbers stored in the relay node number memory means by referencing to the relay node number of each of the packets stored in the packet storage buffer means, when the buffer stored packet detecting means outputs the signal.

5. A packet exchange network as set forth in claim 4, wherein the packet discard processing means comprises means for selecting a packet to be discarded such that the packet discard rates for the packets are substantially the same regardless of the relay node numbers while referencing to a packet discard history at the packet exchange node.

6. A packet exchange network in which communication data is transmitted in the form of a packet, comprising:

a plurality of packet exchange nodes each including packet storage buffer means of a predetermined capacity for sequentially and temporarily storing received packets;

terminals connected to the packet exchange nodes; and a plurality of trunk lines connected between the packet exchange nodes, for transmitting communication data therebetween, the packet storage buffer means being connected in series with the plurality of trunk lines, the communication data being transmitted between the packet exchange nodes and the terminals via a transmission route, the transmission route being determined in each of the packet exchange nodes at a time of setting a call when one of the terminals issues a call connection request for communication, the transmission route thus determined being used until the communication is completed, some of the packets being discarded when the packets are converged into one of the trunk lines so that the packet storage buffer means associated with said one of the trunk lines becomes unable to store all of the packets, wherein the packet exchange nodes each comprise:

relay node memory means for storing a relay node number for each packet, the relay node number being a number of relay packet exchange nodes in the transmission route through which a packet passes;

buffer stored packet detecting means for detecting the number of received packets stored in the packet storage buffer means and for outputting a signal when the detected packet number exceeds a predetermined value corresponding to the predetermined capacity of the storage buffer means;

packet discard processing means for preferentially discarding a packet having a smaller registered relay node number among the relay node numbers stored in the relay node number memory means by referencing to the relay node number of each of the packets stored in the packet storage buffer means, when the buffer stored packet detecting means outputs the signal;

the packet discard processing means having means for selecting a packet to be discarded such that the packet discard rates for the packets are substantially the same regardless of the relay node numbers while referencing to a packet discard history at the packet exchange node; and the packet discard processing means further having packet discard history memory means for storing the packet discard history at the packet exchange node, a packet discard rate table for listing packet discard rates previously determined with respect to the respect relay node numbers so that the packet discard rate are substantially the same regardless of the relay node numbers, and discard packet analyzing means, when the buffer stored packet detecting means outputs the signal, for selecting from the packet discard table the relay node number corresponding to the packet discard rate satisfying that the packet discard rates are substantially the same regardless of the relay node numbers in accordance with the relay node number of each of the packets stored in the packet storage buffer means and the packet discard history stored in the packet discard history memory means, and determining a packet corresponding to the selected registered relay node number as a packet to be discarded.

7. A packet exchange node including a plurality of trunk lines for receiving and transmitting communication data in the form of a packet to another packet exchange node via a communication route, the communication data being transmitted via the same communication route until the communication is completed, the packet exchange node comprising:

packet storage buffer means for storing received communication data for subsequent transmitting, the packet storage buffer means including a relay node number registering section in which a number of packet exchange nodes through which the communication data pass during the communication is to be registered;

buffer stored packet detecting means for detecting the number of received communication data packets stored in the packet storage buffer means; and packet discard processing means responsive to the buffer stored packet detecting means, for preferentially discarding the communication data packets having a smaller registered relay node number by referencing to the relay node number of each of the communicating data stored in the packet storage buffer means when the detected packet number exceeds a predetermined value.

8. A packet exchange network as set forth in claim 7, wherein the packet discard processing means comprises means for selecting a communication data to be discarded such that the packet discard rates for discarding the communication data are substantially the same regardless of the relay node numbers while referencing to a packet discard history at the packet exchange node.

9. A packet exchange node including a plurality of trunk lines for receiving and transmitting communication data in the form of a packet to another packet exchange node via a communication route, the communication data packets being transmitted via the same communication route until the communication is completed, the packet exchange node comprising:

packet storage buffer means for storing received communication data for subsequent transmitting, the packet storage buffer means including a relay node number registering section in which a number of packet exchange nodes through which the communication data packets pass during the communication is to be registered;

buffer stored packet detecting means for detecting the number of received communication data packets stored in the packet storage buffer means;

packet discard processing means responsive to the buffer stored packet detecting means, for preferentially discarding the communication data packets having a smaller registered relay node number by referencing to the relay node number of each of the communicating data packets stored in the packet storage buffer means when the detected packet number exceeds a predetermined value;

the packet discard processing means having means for selecting a communication data packet to be discarded such that the packet discard rates for discarding the communication data are substantially the same regardless of the relay node numbers while referencing to a packet discard history at the packet exchange node; and the packet discard processing means further having packet discard history memory means for storing the packet discard history at the packet exchange node, a packet discard rate table for listing packet discard rates previously determined with respect to the respective relay node numbers so that the packet discard rates are substantially the same regardless of the relay node numbers, and discard packet analyzing means, when the stored packet detecting means outputs the signal, for selecting from the packet discard table the relay node number corresponding to the packet discard rate satisfying that the packet discard rates are substantially the same regardless of the relay node numbers in accordance with the relay node number of each of the communication data packets stored in the packet storage buffer means and the packet discard history stored in the packet discard history memory means, and determining communication data corresponding to the selected registered relay node number as communication data to be discarded.

10. A method of controlling discard of packets in a packet exchange network in which communication data is transmitted in the form of packets, the packet exchange network comprising a plurality of packet exchange nodes each including packet storage buffer means of a predetermined capacity for sequentially and temporarily storing received packets, terminals connected to the packet exchange nodes, and a plurality of trunk lines connected between the packet exchange nodes for transmitting the communication data between the packet exchange nodes, the packet storage buffer means being connected in series with the plurality of trunk lines, wherein the communication data is transmitted between the packet exchange nodes and between the packet exchange nodes and the terminals via a transmission route which is determined in each of the packet exchange nodes at a time of setting a call when one of the terminals issues a call connection request for communication, the transmission route thus determined being used until the communication is completed, and some of the packets are discarded when the packets are converged into one of the trunk lines so that the packet storage buffer means associated with said one of the trunk lines becomes unable to store all of the packets, said method comprising the steps of:

registering in a specific section in each of said packets at the time of setting the call the number of packet exchange nodes through which the packets pass during the communication;

recognizing at each packet exchange node the registered number of packet exchange nodes by referring to the specific section in each incoming packet; and preferentially discarding a packet having a smaller registered packet exchange node number on the basis of the registered number of the packet exchange nodes.

11. A method of controlling discard of packets in a packet exchange network in which communication data is transmitted in the form of packets, the packet exchange network comprising a plurality of packet exchange nodes each including packet storage buffer means of a predetermined capacity for sequentially and temporarily storing received packets, terminals connected to the packet exchange nodes, and a plurality of trunk lines connected between the packet exchange nodes for transmitting the communication data between the packet exchange nodes, the packet storage buffer means being connected in series with the plurality of trunk lines, wherein the communication data is transmitted between the packet exchange nodes and between the packet exchange nodes and the terminals via a transmission route which is determined in each of the packet exchange nodes at a time of setting a call when one of the terminals issues a call connection request for communication, the transmission route thus determined being used until the communication is completed, and some of the packets are discarded when the packets are converged into one of the trunk lines so that the packet storage buffer means associated with said one of the trunk lines becomes unable to store all of the packets, said method comprising the steps of:

registering in a memory section in each of the packet exchange nodes at the time of setting the call the number of packet exchange nodes through which the packets pass during the communication;

recognizing at each packet exchange node the registered number of the packet exchange nodes by referring to a table in the memory section associated with each incoming packet; and preferentially discarding a packet associated with the table in the memory section having a smaller registered packet exhange node number.

12. A method of controlling discard of packets in a packet exchange network in which communication data is transmitted in the form of packets, the packet exchange network comprising a plurality of packet exchange nodes each including packet storage buffer means of a predetermined capacity for sequentially and temporarily storing received packets, terminals connected to the packet exchange nodes, and a plurality of trunk lines connected between the packet exchange nodes for transmitting the communication data between the packet exchange nodes, the packet storage buffer means being connected in series with the plurality of trunk lines, wherein the communication data is transmitted between the packet exchange nodes and between the packet exchange nodes and the terminals via a transmission route which is determined in each of the packet exchange nodes at a time of setting a call when one of the terminals issues a call connection request for communication, the transmission route thus determined being used until the communication is completed, and some of the packets are discarded when the packets are converged into one of the trunk lines so that the packet storage buffer means associated with said one of the trunk lines becomes unable to store all of the packets, said method comprising the steps of:

registering in a specific section in each of the packets at the time of setting the call the number of packet exchange nodes through which the packets pass during the communication;

recognizing at each packet exchange node the registered number of packet exchange nodes by referring to the specific section in each incoming packet; and changing a packet discard rate at each of the packet exchange nodes through which the packets pass during the communication according to the registered number of the packet exchange nodes so that all the packets have a same predetermined discard rate independently of the number of the packet exchange nodes through which the packets pass.

13. A method of controlling discard of packets in a packet exchange network in which communication data is transmitted in the form of a packet, the packet exchange network comprising a plurality of packet exchange nodes each including packet storage buffer means of a predetermined capacity for sequentially and temporarily storing received packets, terminals connected to the packet exchange nodes, and a plurality of trunk lines connected between the packet exchange nodes for transmitting the communication data between the packet exchange nodes, the packet storage buffer means being connected in series with the plurality of trunk lines, wherein the communication data is transmitted between the packet exhange nodes and between the packet exchange nodes and the terminals via a transmission route which is determined in each of the packet exchange nodes at the time of setting a call when one of the terminals issues a call connection request for communication, the transmission route thus determined being used until the communication is completed, and some of the packets are discarded when the packets are converged into one of the trunk lines so that the packet storage buffer means associated with said one of the trunk lines becomes unable to store all of the packets, said method comprising the steps of:

registering in a memory section in each of the packet exchange nodes at the time of setting the call the number of packet exchange nodes through which the packets pass during the communication;

recognizing at each packet exchange node the registered number of the packet exchange nodes by referring to a table in the memory section associated with each incoming packets;

changing a packet discard rate at each of the packet exchange nodes through which the packets pass during the communication according to the registered number of the packet exchange nodes so that all the packets have a same predetermined discard rate independently of the number of the packet exchange nodes through which the packets pass.

* * * * *